United States Patent
Ruan et al.

(10) Patent No.: US 11,227,632 B2
(45) Date of Patent: Jan. 18, 2022

(54) RADIAL SERVO DEVICE FOR SUPER-RESOLUTION OPTICAL DISC AND SERVO CONTROL METHOD THEREFOR

(71) Applicant: Shanghai Institute of Optics and Fine Mechanics, Chinese Academy of Sciences, Shanghai (CN)

(72) Inventors: Hao Ruan, Shanghai (CN); Qiao Hu, Shanghai (CN); Xupeng Yuan, Shanghai (CN); Xinjun Guo, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 17/050,271

(22) PCT Filed: Apr. 16, 2019

(86) PCT No.: PCT/CN2019/082921
§ 371 (c)(1),
(2) Date: Dec. 31, 2020

(87) PCT Pub. No.: WO2019/205993
PCT Pub. Date: Oct. 31, 2019

(65) Prior Publication Data
US 2021/0151079 A1    May 20, 2021

(30) Foreign Application Priority Data
Apr. 26, 2018 (CN) .......................... 201810385410.0

(51) Int. Cl.
G11B 7/09 (2006.01)
G11B 7/08 (2006.01)
G11B 7/085 (2006.01)

(52) U.S. Cl.
CPC ............ *G11B 7/0903* (2013.01); *G11B 7/081* (2013.01); *G11B 7/08552* (2013.01); *G11B 7/093* (2013.01)

(58) Field of Classification Search
None
See application file for complete search history.

(56) References Cited

U.S. PATENT DOCUMENTS

| 2008/0013441 A1* | 1/2008 | Oouchida | B82Y 10/00 369/275.4 |
| 2008/0159119 A1* | 7/2008 | Minemura | G11B 7/24065 369/277 |

(Continued)

FOREIGN PATENT DOCUMENTS

| CN | 1656546 A | 8/2005 |
| CN | 101046995 A | 10/2007 |

(Continued)

OTHER PUBLICATIONS

Horigome et al., English Machine translation of JP 2008305509 A (Published on Dec. 18, 2008). (Year: 2008).*

(Continued)

*Primary Examiner* — William J Klimowicz
(74) *Attorney, Agent, or Firm* — Panitch Schwarze Belisario & Nadel LLP

(57) ABSTRACT

A radial servo control device for a super-resolution optical disc includes an excitation light source, a servo light source, an integrated optical path, focusing units, a servo light detecting unit and a drive control unit; the drive control unit presets N detection error reference values with respect to each guide layer trench irradiated by servo light, and controls corresponding positions of the focusing units in N data tracks below each guide layer trench according to a comparison result between a detection result of servo reflected light and the detection error reference values. The device is (Continued)

applicable to a variety of super-resolution optical discs on the basis of stimulated radiation loss microscopy technology, a two-photon absorption technology, and the like, and achieves accurate radial servo control of super-resolution data tracks (<100 nm) without reducing the wavelength of servo light and the width of guide layer trenches.

24 Claims, 5 Drawing Sheets

(56) References Cited

U.S. PATENT DOCUMENTS

| | | | |
|---|---|---|---|
| 2008/0239922 A1* | 10/2008 | Fujita | G11B 7/1369 |
| | | | 369/103 |
| 2012/0008484 A1* | 1/2012 | Yamatsu | G11B 7/00455 |
| | | | 369/112.23 |
| 2012/0014237 A1* | 1/2012 | Nakai | G11B 20/10416 |
| | | | 369/47.25 |

FOREIGN PATENT DOCUMENTS

| | | |
|---|---|---|
| CN | 101727926 A | 6/2010 |
| CN | 102280122 A | 12/2011 |
| JP | 2008305509 A * | 12/2008 |
| WO | 2009003192 A1 | 12/2008 |

OTHER PUBLICATIONS

Int'l Search Report dated Jun. 14, 2019 in Int'l Application No. PCT/CN2019/082921.

* cited by examiner

RADIAL SERVO DEVICE FOR SUPER-RESOLUTION OPTICAL DISC AND SERVO CONTROL METHOD THEREFOR

CROSS-REFERENCE TO RELATED APPLICATIONS

This application is a Section 371 of International Application No. PCT/CN2019/082921, filed Apr. 16, 2019, which was published in the Chinese language on Oct. 31, 2019 under International Publication No. WO 2019/205993 A1, which claims priority under 35 U.S.C. § 119 to Chinese Patent Application No. 201810385410.0, filed on Apr. 26, 2018 the disclosures of all of which are incorporated herein by reference.

TECHNICAL FIELD

The invention relates to the field of optical disc control, in particular to a radial servo device for super-resolution optical disc and servo control method therefor.

BACKGROUND ART

Due to the restriction of the optical diffraction limit effect, traditional optical storage has approached the limit of its storage density, and it is difficult to meet the storage demand under the explosive growth of information in the era of big data. Therefore, in order to fundamentally solve this problem, it is necessary to break through the limit of optical diffraction and obtain smaller data recording points.

In recent years, people have discovered some methods that can break through the optical diffraction limit, such as super-resolution fluorescence microscopy (Nobel Prize in 2014), two-photon absorption technology, super-resolution optical absorption technology, medium super-resolution technology, etc. Although not all technologies are found in the optical disc field, they all likely to be applied to the optical disc field to achieve ultra-high density storage.

However, the breakthrough of the diffraction limit does not mean that a new generation of optical disc technology is coming in an all-round way. Technically, a matching optical disc servo control system is required. Optical disc servo technology is the core technology of optical disc drives, and a servo control system matching with super-resolution optical discs has not yet been developed. The reason is that the super-resolution recording point is much smaller than the current minimum information point for Blu-ray discs whose size is 138 nm. It is difficult to realize the servo control of the super-resolution recording point, especially the tracking servo control in the radial direction, during the process of disc recording and reading. Traditional CD, DVD, and BD (Blu-ray Discs) generally use reflection-based methods to read information and servo control. The principles of them are basically the same, except that the size of the pre-groove decreases as the recording point decreases. However, for super-resolution optical discs, neither excitation light nor servo light can achieve radial tracking servo by reducing the pre-groove pitch to the size of super-resolution recording points, because both are limited by the diffraction limit. A magneto-optical hybrid servo system is mentioned in [0071] of the cited reference [1]. The magneto-optical hybrid servo system can realize error signal detection and position correction through pre-encoded position signals in the track groove, but it needs to pre-embed the magnetic field lines in the recording layer of each optical disc to realize the tracking servo of the radial position. If the super-resolution optical discs are manufactured by this method, the cost will be very high, possibly up to USD/MB. In addition, the idea of using fluorescent quantum dots for tracking still exists great obstacles in terms of current semiconductor development technology. Therefore, there is an urgent need to develop a low-cost, high-precision servo device for a super-resolution optical disc and servo control method therefor.

SUMMARY OF THE INVENTION

Given that the storage point of the super-resolution optical disc is smaller than the optical diffraction limit, it is difficult to achieve servo during the reading and writing process and the shortcomings of the existing servo technology, the purpose of the present invention is to provide a radial servo device for a super-resolution optical disc and a servo control method therefor, which can accurately perform radial tracking servo during the reading and writing process of the super-resolution optical disc.

In order to achieve the above and other related purposes, the present invention provides a radial servo device for a super-resolution optical disc, comprising excitation light source, servo light source, integrated optical path, focusing unit, servo light detection unit, and drive control unit;

the excitation light source emits excitation light, and the servo light source emits servo light, and the excitation light and the servo light reach the focusing unit through the integrated optical path, being focused on the disc surface, the servo light passes through the focusing unit again after being reflected on the disc surface, and then the reflected light is detected by the servo light detection unit, and the detection result is transmitted to the drive control unit;

the excitation light source comprises at least one laser light source with a single wavelength or laser light source with different wavelengths;

the super-resolution optical disc comprising multi-layer structure, which comprises a servo guide layer containing a spiral groove shape and at least one data recording layer existing thereunder;

the data storage units distributed in a spiral form in the data recording layer, the data storage units on each spiral constituting a data storage track, wherein every N data storage tracks correspond to a groove in the servo guide layer, and N is an integer greater than 1;

the integrated optical path comprising a collimator lens, which integrates the servo light and the excitation light to form a coaxial circular parallel beam;

the focusing unit at least comprising optical element capable of focusing and focuses the excitation light and the servo light on the same axis;

the servo light detection unit detects the servo reflected light beam generated by the servo light beam converged by the focusing unit and reflected by the servo guide layer;

the drive control unit presets N detection error reference values for each guide layer groove irradiated by the servo light, and controls the position of the corresponding focus unit in the N data tracks under each guide layer groove according to the comparison result of the detection result of the servo reflected light and the detection error reference value, so that the excitation light is focused and N is an integer greater than 1.

Preferably, the super-resolution optical disc adopts the methods comprising super-resolution fluorescence microscopy, two-photon absorption technology, super-resolution optical filtering technology, and medium super-resolution technology to produce recording point smaller than the diffraction limit of the excitation light.

Preferably, the smallest size of the data storage units is smaller than the diffraction limit of the excitation light.

Preferably, the servo light source and the excitation light source have different wavelengths.

Preferably, the numerical aperture of the focusing unit is not less than 0.65.

The present invention also provides a servo method for the super-resolution optical disc comprising the following steps:

Step 1: the servo light is focused on the spiral guide groove on the disc through the lens;

Step 2: the reflected light of the servo light is detected by the signal detection unit and the detection result is transmitted to the drive control unit;

Step 3: the drive control unit controls the position of the lens according to the detection result to move the focus of the excitation light to the desired data track;

the drive control unit completes the radial servo of N data tracks according to the reflected light of the servo light in a groove, wherein N is an integer greater than 1.

Preferably, the drive control unit pre-sets N reference values for the servo light irradiating different positions in a single groove, comparing detection result of the detection unit with the reference values, drive signal being output to move the objective lens to the target position.

As described above, the radial servo device for a super-resolution optical disc and servo control method therefor of the present invention have the following beneficial effects:

(1) Compared with the existing blue-ray servo control system, the present invention controls the radial servo of multiple data tracks through one servo guide groove, which can realize the radial tracking servo control with a narrower signal track (less than 100 nm) without changing the wavelength of the servo light and the groove width of the servo guide layer:

(2) Tracking radial reading and writing by introducing the servo light, controlling the focus by using the fluorescence signal generated by excitation light, realizing radial tracking servo by detecting error signal and setting offset, and finally realizing multi-layer ultra-high density data storage;

(3) The present invention breaks through the constraints of the diffraction limit by adopting technologies based on stimulated radiation loss microscopy, two-photon absorption technologies and so on, and effectively reduces the size of the effective spot, thereby greatly improving the storage density of the optical disk;

(4) The present invention uses nanometer-level precision photodetector, and the designed servo control computing module to control the movement and cooperation of the two-dimensional and one-dimensional translation stages, ensuring the high accuracy of the radial servo and axial servo of the optical head;

(5) The present invention does not need to set servo markers on each recording layer, and has the advantages of low cost, flexibility and convenience, large storage capacity, and a single disk capacity of more than 1 TB.

(6) The present invention can be applied to the radial servo control of a variety of super-resolution optical discs, with wide applicability;

(7) The present invention has the advantages of simple structure, convenient operation, and good compatibility with other servo controls such as focus servo, rotational speed servo, etc.

DESCRIPTION OF THE COMPONENT LABELS

Figure 1:
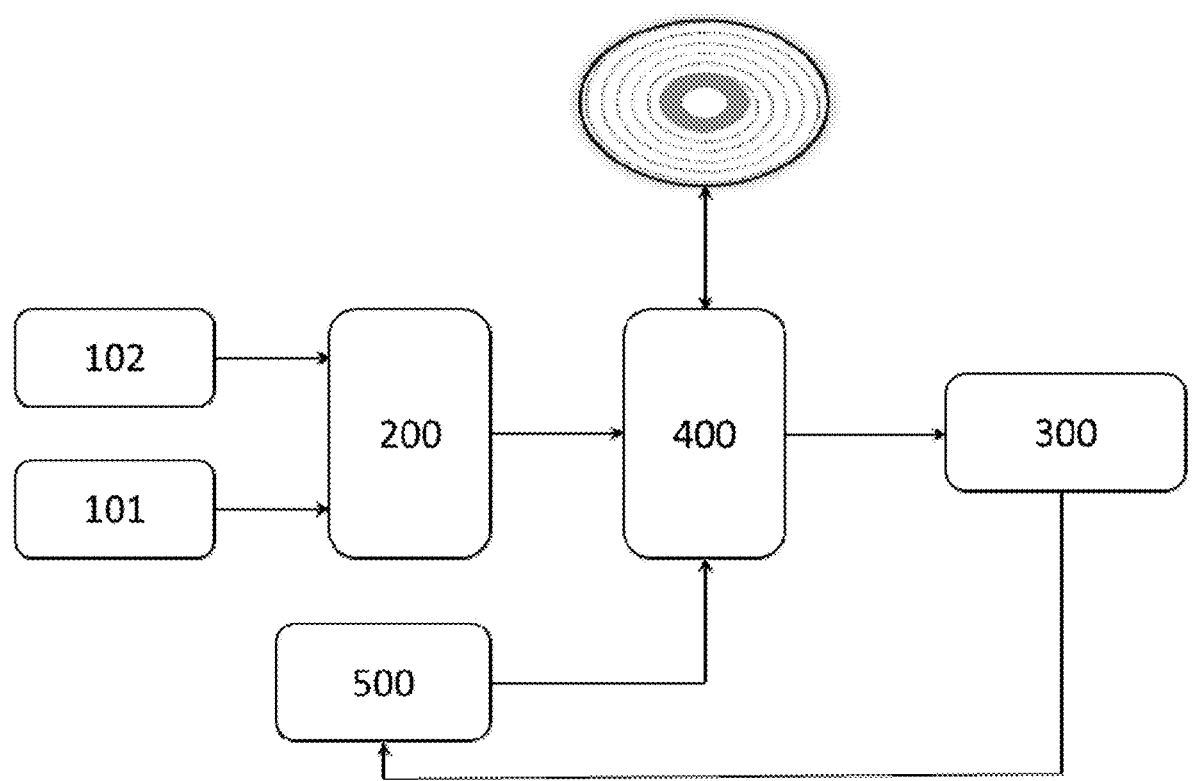
FIG. 1 is a schematic diagram showing the overall architecture of the radial servo device for a super-resolution optical disc proposed by the present invention.

200 Integrated light path
300 Servo light detection unit
400 Focusing unit
500 Drive control unit
001 Super-resolution optical disc
002 Nth information recording layer
003 N+1th information recording layer
004 Servo guide layer
005 Spindle motor
006 Data storage point
101 Excitation light source
102 Servo light source
103 Loss light source
104 Excitation light
105 Loss light
106 Fluorescence signal
107 Two-photon second excitation light source
201 Collimator lens
202 Collimator lens
203 Relay lens
204 Relay lens
205 Polarization beam splitter
206 Dichroic mirror
207 Relay lens
208 Focusing lens
209 ¼ wave plate
210 Reflector
211 Collimator lens
212 ½ wave plate
213 Polarization beam splitter
214 Dichroic mirror
215 ½ wave plate
216 Polarization beam splitter
217 Vortex phase plate
218 Dichroic mirror
220 Filter
221 Astigmatic lens
222 Polarizer
223 Phase delay component
224 Polarizer 225 Reflector
301 Photodetector
302 Photodetector
401 Objective lens
501 Servo control computing module
502 Two-dimensional translation stage
503 One-dimensional translation stage

MODES OF CARRYING OUT THE INVENTION

The following specific examples illustrate the implementation of the present invention. Those skilled in the art can easily understand other advantages and effects of the present invention from the content disclosed in this specification.

It should be noted that the structure, ratio, size, etc. shown in the accompanying drawings are only used to match the content disclosed in the specification for those who are familiar with this technology to understand and read, and are not intended to limit the limited conditions that the present invention can be implemented, so it has no technical significance. Any structural modification, proportional relationship change or size adjustment should still fall within the scope of the technical content disclosed in the present invention, without affecting the effects and objectives that the present invention can achieve. Meanwhile, the terms such as "up", "down", "left", "right", "middle" and "a/an" cited in this specification are only for the convenience of description and are not used to limit the scope of implementation of the present invention, and the change or adjustment of the relative relationship should be regarded as the scope of implementation of the present invention without substantial changes to the technical content.

Example 1

The overall architecture of the radial servo device for the super-resolution optical disc proposed by the present invention is shown in FIG. 1. The excitation light source emits excitation light, and the servo light source emits servo light. The excitation light and the servo light reach the focusing unit through the integrated optical path, and being focused on the disc surface. The servo light passes through the focusing unit again after being reflected on the disc surface. Then the reflected light is detected by the servo light detection unit, and the detection result is transmitted to the drive control unit. The drive control unit calculates and issues instructions according to the detection result to control the position of the focusing unit, thus realizing radial servo control.

Figure 2:
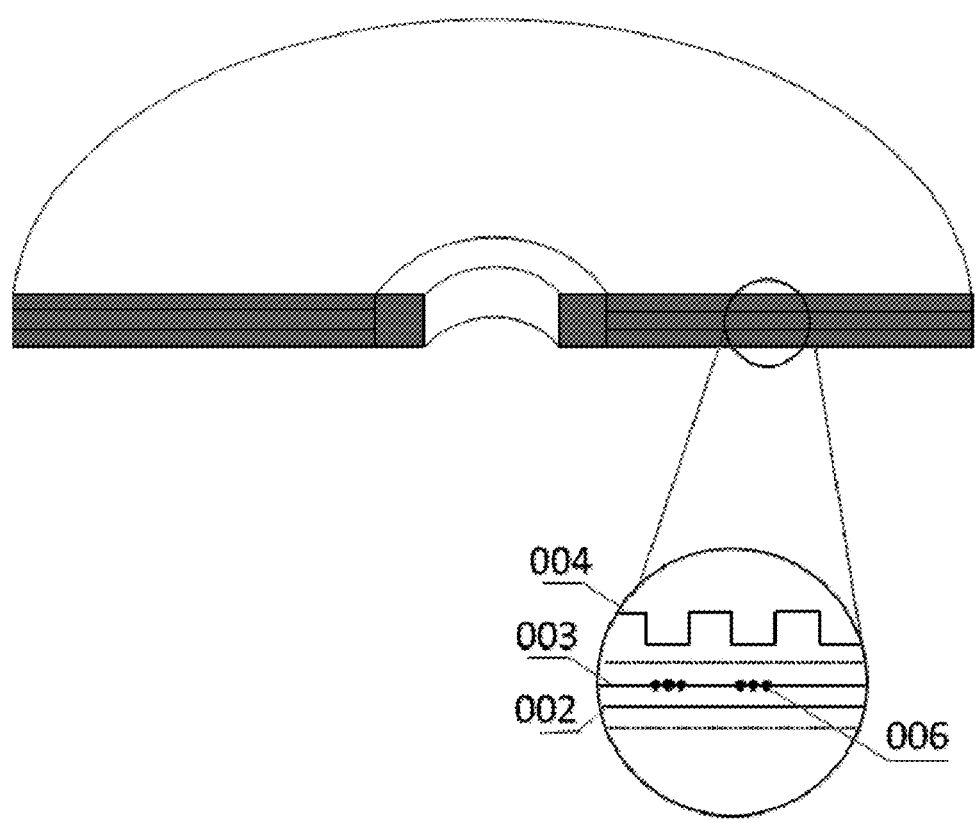
FIG. 2 is a schematic cross-sectional view showing the basic structure of the super-resolution optical disc according to the present invention.
Figure 3:
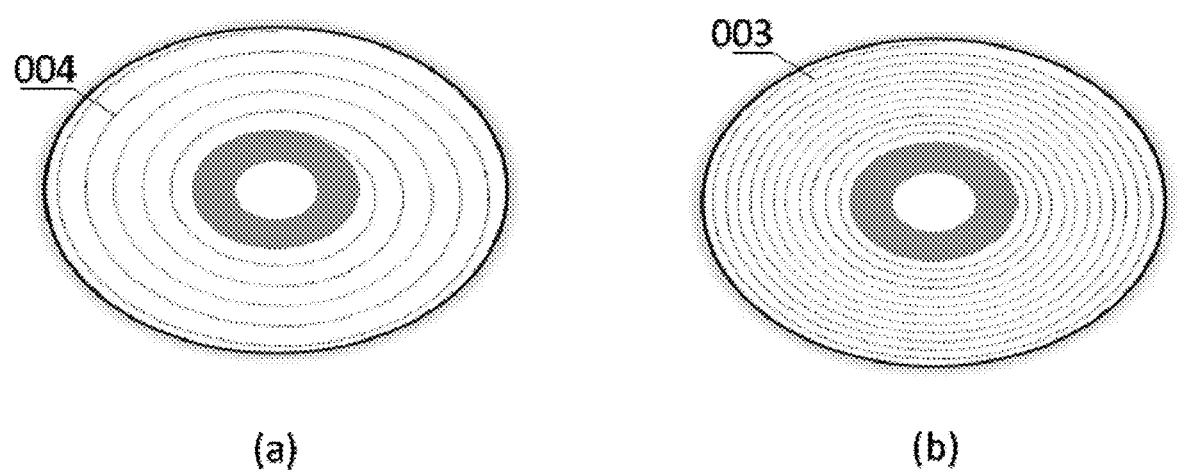
FIG. 3 is a schematic diagram showing the servo guide layer and data recording track of the super-resolution optical disc according to the present invention.

The basic structure of the super-resolution optical disc according to the present invention is shown in FIG. 2. It comprises a groove-shaped servo guide layer, and at least one data recording layer existing thereunder. Directly below each groove, there are N data tracks, N=3 in the figure. The grooves on the guide layer and the data tracks in the data recording layer both present a spiral distribution, as shown in FIG. 3.

Figure 4:
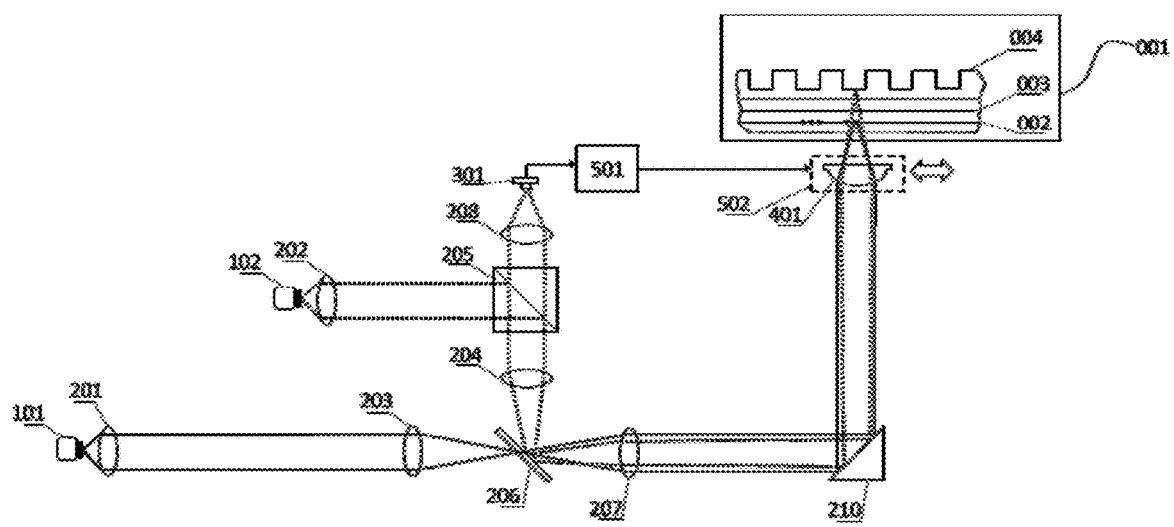
FIG. 4 is a schematic diagram showing a specific implementation of the radial servo device according to the present invention.

FIG. 4 shows a specific implementation of the radial servo device of the present invention. As shown in the figure, the coaxial parallel beam formed by the excitation light source and the servo light after passing through the integrated optical path is focused on the optical disc through the objective lens. Due to the chromatic aberration between the excitation light and the servo light, the focus of the two is not at the same point. The focus of the excitation light is on the data recording layer, and the focus of the servo light is on the servo guide layer. The servo light reflected by the servo guide layer passes through the objective lens again to become a parallel beam, which passes through the lens, dichroic mirror, lens, ¼ plate, beam splitter, and lens, and then irradiates the photodetector. The photodetector transmits the generated electrical signal to the servo control computing module. The servo control computing module outputs the servo tracking signal according to the input electrical signal to drive the nano-displacement platform to move the objective lens in the horizontal direction, thereby achieving the purpose of radial servo.

Figure 5:
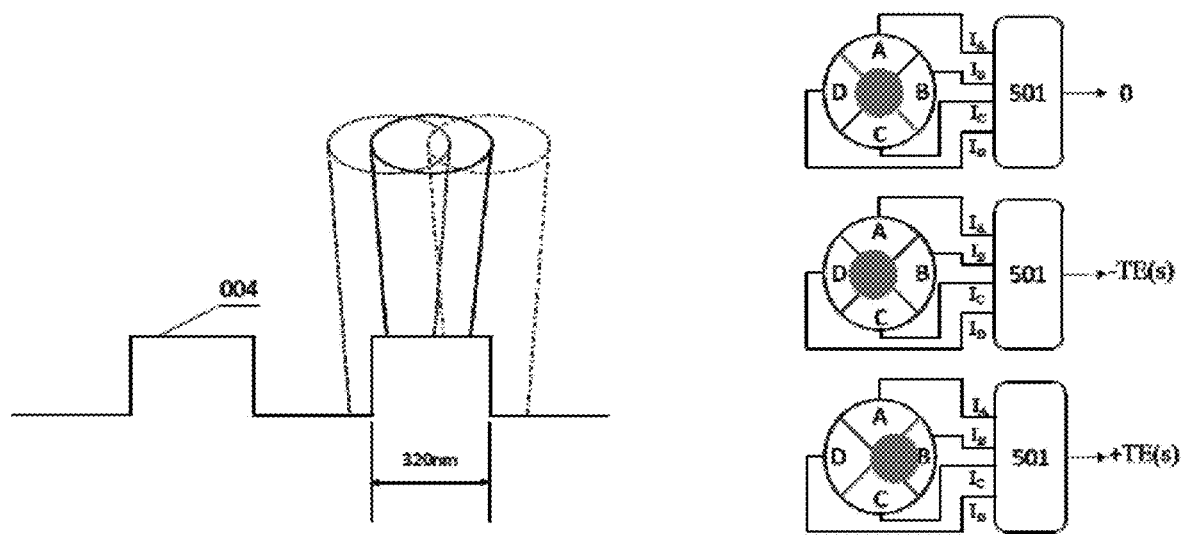
FIG. 5 is a schematic diagram showing a radial tracking error detection process according to an example of the present invention.

The tracking error detection process of the present invention is shown in FIG. 5. When the servo spot is focused on the middle of a groove on the servo guide layer, the excitation light is also focused on the data track in the middle below the track. At this time, a circular spot is received on the four-quadrant photodetector, and the light intensity on the four quadrants is equal, and the output current $I_A=I_B=I_C=I_D$, then $(I_A+I_B)-(I_C+I_D)=0$. If the servo light is focused on the left position, the four-quadrant photodetector will output current $I_A \neq I_B$, $I_C \neq I_D$, and $(I_A+I_B)<(I_C+I_D)$. If the servo light is focused on the right position, the four-quadrant photodetector will output current $I_A \neq I_B$, $I_C \neq I_D$, and $(I_A+I_B)>(I_C+I_D)$. If the error signal $E=(I_A+I_B)-(I_C+I_D)$, then each point in the radial direction under the guide layer groove corresponds to a unique E value. Therefore, the E value at the position of the data track can be selected as the reference value of the error signal of the track. During the radial tracking process, the driving signal can be determined by comparing the actual error signal with the reference value. When there are N data tracks under a groove, the error signal reference values are $E_1, E_2, \ldots E_N$ respectively.

The following example is used to illustrate: when N=3, there are three error signal reference values $E_1$, $E_2$ and $E_3$ respectively. Among them, $E_2$ represents the error signal reference value of the data track directly below the groove of the guide layer, and its value is the value of $(I_A+I_B)-(I_C+I_D)$, when the servo light is focused on the middle of the groove. At this time, its value is 0, that is, $E_2=0$.

Assuming that it is the data track in the middle below the groove that needs to be tracked and servo, during the actual servo process, if the detected error signal $E=E_2$, it means that the read and write optical focus is already on the track to be tracked, so the tracking servo signal output by the servo control computing module 501 is also 0. If the detected error signal $E<E_2$, it means that the servo light is focused on the left position, and the output tracking servo signal is $-TE(s)$, which drives the nano platform to move the objective lens to the right by the set offset. If the detected error signal $E>E_2$, it means that the servo light is focused on the right position, and the output tracking servo signal is $+TE(s)$, which drives the nano platform to move the objective lens to the left by the set offset. The magnitude of the movement offset is calculated based on the difference between E and $E_2$.

Similarly, if the data track on the left below the groove needs to be tracked and servo, the reference value is the value of $(I_A+I_B)-(I_C+I_D)$ when the excitation light is focused here, and it is easy to know that $E_1<0$ at this time. During the actual servo process, if the detected error signal $E=E_2$, it means that the read and write optical focus is already on the track to be tracked, so the tracking servo signal output by the servo control computing module 501 is also 0. If the detected error signal $E<E_2$, it means that the servo light is focused on the left position, and the output tracking servo signal is $-TE(s)$, which drives the nano platform to move the objective lens to the right by the set offset. If the detected error signal $E>E_2$, it means that the servo light is focused on the right position, and the output tracking servo signal is +TE(s), which drives the nano platform to move the objective lens to the left by the set offset. The magnitude of the movement offset is calculated based on the difference between E and $E_1$.

Example 2

This example shows the specific implementation of the present invention applied to the radial servo of a super-resolution optical disc based on stimulated radiation loss microscopy.

Stimulated radiation loss microscopy uses the principle of stimulated radiation and requires two strictly coaxial lasers, wherein one of which is excitation light, the other is loss light (also called STED light). The sequence of the action of the two lasers can be changed, and the duration of action may also vary depending on the recording medium. The key lies that the loss light converts the supposed excited state at the edge of the range where the excitation light and the recording medium can act into a non-fluorescent state. Therefore, when super-resolution optical disc based on stimulated radiation loss microscopy is used for data recording and reading, a beam of Gaussian-shaped excitation light constrained by the diffraction limit is focused on the recording layer of the optical disc to initiate optical recording, and another vortex circular focused spot (also called STED light) with zero light intensity at the center is used to suppress optical recording, and the centers of the two beams coincide with each other. At this time, the optical recording phenomenon can only occur in the center of the focused spot and is suppressed at the edge, thereby reducing the size of the effective recording spot, and achieving the purpose of increasing the storage capacity by increasing the recording density.

Figure 6:
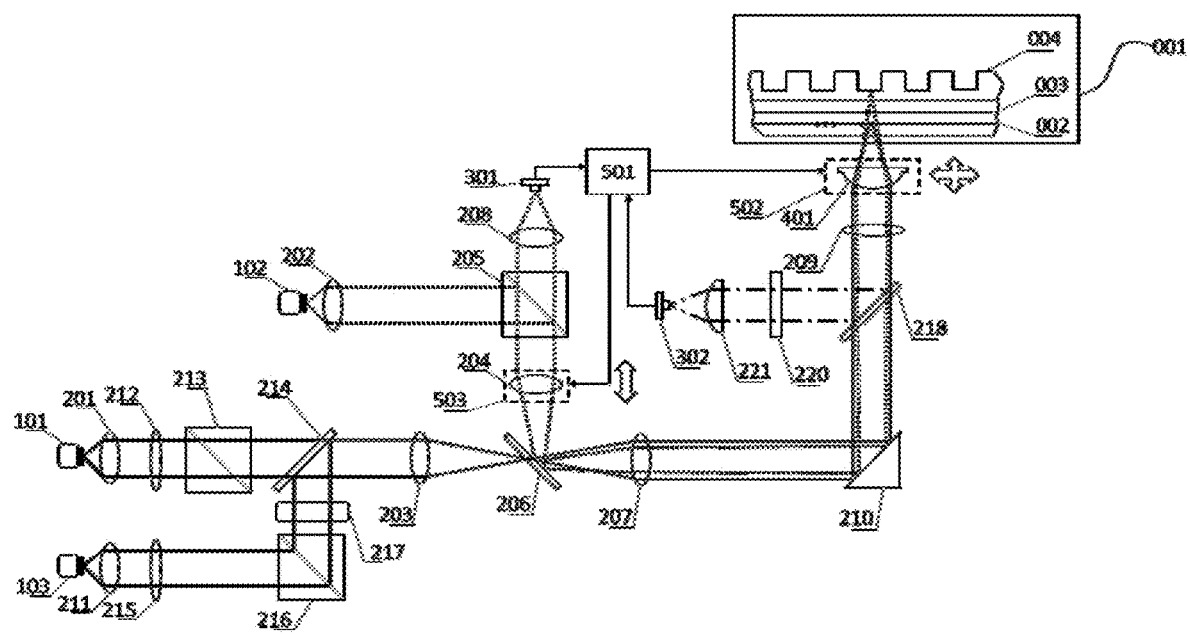
FIG. 6 is a schematic diagram showing the structure of the servo device of the super-resolution optical disc based on stimulated radiation loss microscopy according to the present invention.

The structure of the servo device for the super-resolution optical disc based on stimulated radiation loss microscopy of the present invention is shown in FIG. 6, which mainly realizes data writing and reading.

The excitation light source 101 emits a beam of light with a center wavelength of and its wavelength is near the center of the excitation spectrum of the recording medium. In order to prevent the light emitted by the laser from being not an ideal spherical wave, a collimator lens 201 is used to shape the emitted light into a circular beam. ½ wave plate 212 is used to adjust the light intensity of circular light, and then the light passes through the polarization beam splitter 213 to become linearly polarized light.

The loss light source 103 emits a beam of light with a center wavelength of λ2, and its wavelength is at the end of the excitation spectrum of the recording medium. In order to prevent the light emitted by the laser from being not an ideal spherical wave, a collimator lens 201 is used to shape the emitted light into a circular beam. ½ wave plate 212 is used to adjust the light intensity of circular light, and then the light passes through the polarization beam splitter 216 to become linearly polarized light. The vortex phase plate 217 is used to process linearly polarized light into a hollow vortex light with a center light intensity of zero.

The dichroic mirror 214 reflects $\lambda_2$ and transmits $\lambda_1$, so the hollow vortex light and linearly polarized light are coupled into one optical path. The relay lens 203, relay lens 207, and reflector 210 can be adjusted to compensate the spherical aberration for the hollow vortex light and the linearly polarized light, and the spot sizes of the two respectively reach the size close to the diffraction limit. The ¼ wave plate 209 processes the hollow vortex light and linearly polarized light after compensating spherical aberration into circularly polarized solid light to achieve the best result of stimulated emission loss. Finally, the hollow loss light and the circularly polarized solid light are focused on the selected recording layer medium through the objective lens 401 to complete the data writing.

The excitation light and the loss light on the recording layer media together excite a fluorescent signal 106 that breaks the diffraction limit, and the center wavelength is $\lambda_3$. The dichroic mirrors 218 and 206 reflect $\lambda_3$, while transmit $\lambda_1$ and $\lambda_2$, since the energy of the fluorescence signal is much smaller than the loss light used. For the filter 220, a bandpass filter with a center wavelength of $\lambda_3$ and cut-off wavelengths of $\lambda_1$ and $\lambda_2$ should be selected. The light is focused on the photodetector 302 through an astigmatic lens 221 such as a cylindrical mirror. The photodetector 302 adopts an avalanche photodiode four-quadrant photodetector, which can amplify and detect the fluorescence signal, thereby reading the signal.

In addition, due to the characteristics of the astigmatic lens 221, the astigmatic beam will have axial asymmetry near the focal point, and the intensity of the detected fluorescence signal will change. The two-dimensional translation stage 502 is adjusted according to the focus error signal detected by the photodetector 302 to drive the objective lens 401 for axial movement to achieve axial focus servo.

During the reading and writing process of the optical disc, a laser with a center wavelength of $\lambda_4$ is emitted from the servo laser light source 102, which is shaped into a circular beam by the collimator lens 202, and becomes s-polarized light by the polarization beam splitter 205. The dichroic mirror 206 reflects $\lambda_4$, while transmits Xi and $\lambda_2$, making the servo light and the two recording light paths integrated, and only one objective lens is needed. The servo recording layer 004 has high reflection characteristics for the servo light. After reflection, it is equivalent to passing through the ¼ wave plate 209 twice before and after. At this time, the reflected servo light becomes p-polarized light, so when it passes through the polarization beam splitter 205, it is separated from the emitted servo light and focused on the photodetector 301 by the focusing lens 208. The error signal generated by it adjusts the two-dimensional translation stage 502 to move the objective lens 401 for radial movement to achieve radial tracking servo. If the disc contains multiple data recording layers, when the recording layer changes from the Nth layer to the N+1th layer, the one-dimensional translation stage 503 needs to be adjusted to drive the relay lens 204 to move at the same time, so that the servo light can be always locked and focused on the servo guide layer 004, thereby realizing radial tracking servo.

When the distance of the groove structure of the servo guide layer is 320 nm, and the size of the super-resolution recording dot is about 50 nm, at least three information tracks can be stored in the corresponding range of the recording layer within a groove width of 320 nm of the servo guide layer. The distance between adjacent information tracks is 110 nm, so the capacity of a single disc can reach more than 1 TB. When the size of super-resolution recording points and the interval between adjacent information tracks are reduced, and the number of recording layers is increased, the capacity of a single disc can continue to increase substantially.

Figure 7:
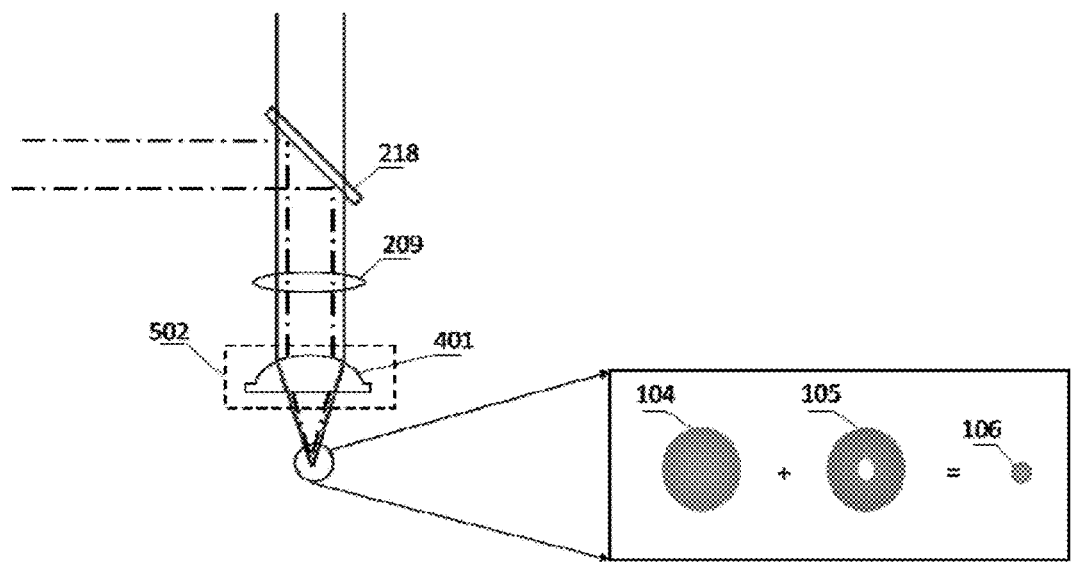
FIG. 7 is a schematic diagram showing the recording principle of the super-resolution optical disc based on stimulated radiation loss microscopy.

The recording principle of super-resolution optical disc based on stimulated radiation loss microscopy is shown in FIG. 7. It shows that the super-resolution fluorescence signal is the result of the combined action of circularly polarized solid light 104 and vortex hollow light 105. The circularly polarized solid light 104 is generated by the excitation light with the center wavelength $\lambda_1$ focused on the surface of the recording medium by the optical elements shown in FIG. 6. The vortex hollow light 105 is generated by the loss light with the center wavelength $\lambda_2$ focused on the surface of the recording medium by the optical elements shown in FIG. 6. In order to achieve the super-resolution recording effect, the centers of the excitation light and the loss light are aligned, and the sequence of their actions and the pulse length should be matched with the current recording medium.

Figure 8:
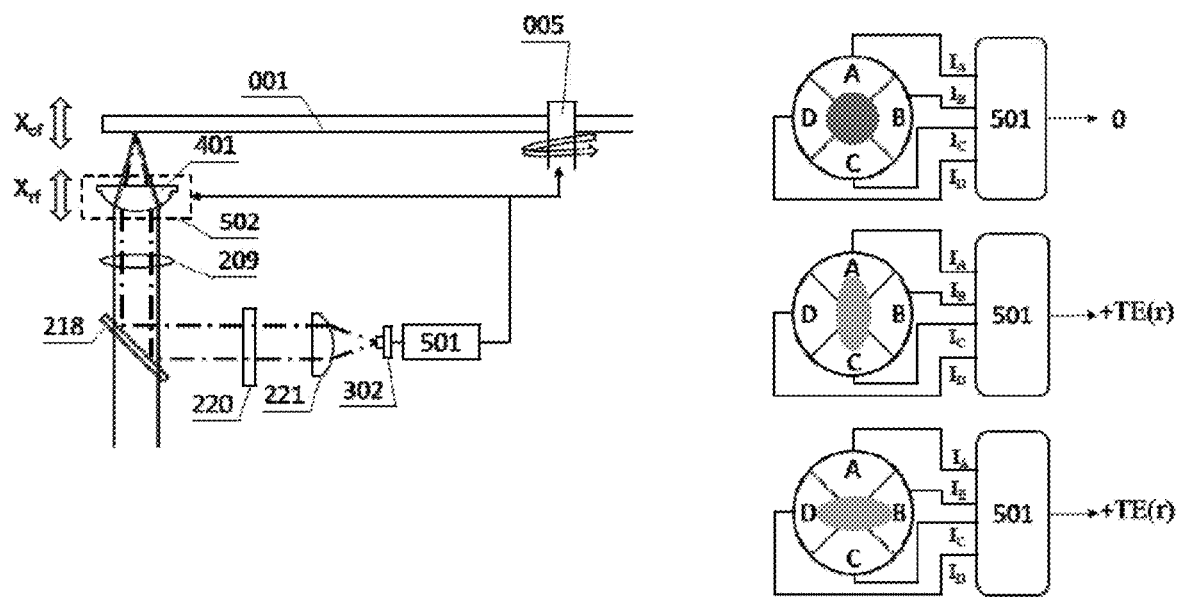
FIG. 8 is a schematic diagram showing a focus error detection process in an example of the present invention.

FIG. 8 shows a schematic diagram of the focus error detection process when the disc is rotating at a high speed and the disc vibrates with $X_{0f}$. The photodetector 302 is a four-quadrant photodetector. When the objective lens 401 is in focus, a circular spot is received on the four-quadrant photodetector. The light intensity on the four quadrants is equal, and the output current $I_A=I_B=I_C=I_D$, and the fluorescence signal is the strongest at this time. The focus servo signal output by the servo control computing module 501 is 0. If the optical disc is too far from the objective lens, astigmatism will occur after the fluorescent signal passes through the astigmatic lens 221, thus the detector receives an elliptical spot with the long axis in the vertical position, the output current $I_A \neq I_B$, $I_C \neq I_D$, $(I_A+I_C)>(I_B+I_D)$, and the output focus servo signal is +TE(r). If the information surface of the optical disc is too close to the objective lens, on the contrary, the output focus servo signal is −TE(r). The focus servo signal drives the nano-platform to move the objective lens $X_{rf}$ in the vertical direction, following the vibration of the disc. If the disc vibration frequency is too fast and the focus servo signal is delayed in output, the spindle speed is controlled to reduce.

The radial servo process in this example is the same as that in Example 1. Firstly, the system presets N error signal reference values $E_1, E_2, \ldots E_N$, according to the number of information tracks N (N=3 shown in the figure) corresponding to each groove. During the actual servo process, for the Kth track, if the detected error signal $E=E_k$, it means that the reading and writing optical focus is already on the track to be tracked, so the tracking servo signal output by the servo control computing module 501 is also 0. If the detected error signal $E<E_k$, it means that the servo light is focused on the left position, and the output tracking servo signal is −TE(s), which drives the nano platform to move the objective lens to the right by the set offset. If the detected error signal $E>E_k$, it means that the servo light is focused on the right position, and the output tracking servo signal is +TE(s), which drives the nano platform to move the objective lens to the left by the set offset. The magnitude of the movement offset is calculated based on the difference between E and $E_k$.

Example 3

This example shows the specific implementation of the present invention the radial servo of a super-resolution optical disc based on two-photon absorption technology.

In the case of high photon density, the fluorescent molecule can absorb two long-wavelength photons at the same time. Under the action of the energy of the two photons, after a short lifetime of excited state, the fluorescent molecule transitions to the excited state and emits a photon with shorter wavelength. The probability of two-photon absorption depends on the degree of coincidence of two incident photons in space and time (the interval between two photons reaching the fluorescent molecule is less than 1 femtosecond). The two-photon absorption cross section is very small, and only the fluorophores in the region with a large photon flux will be excited, so it can produce fluorescent spots smaller than the diffraction limit.

Figure 9:
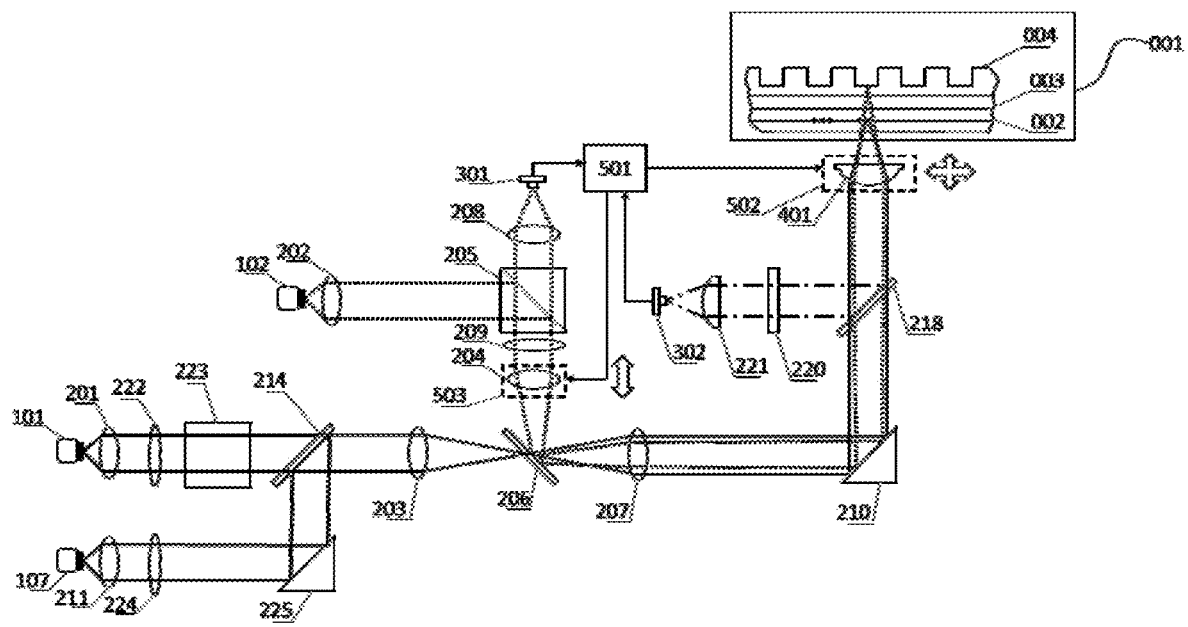
FIG. 9 is a schematic diagram showing the structure of a servo device for a super-resolution optical disc based on two-photon absorption technology of the present invention.

The structure of the servo device for the super-resolution optical disc based on two-photon absorption technology of the present invention is shown in FIG. 9, which mainly realizes data writing and reading.

The excitation light source 101 emits a beam of light with a center wavelength of $\lambda_1$, and the collimator lens 201 is used to shape the emitted light into a circular beam. Then the light passes through the polarizer 222 to become linearly polarized light, and then passes through the phase delay component 223 to adjust the phase.

Another excitation light source 107 emits a beam of light with a center wavelength of $\lambda_2$, and the collimator lens 211 is used to shape the emitted light into a circular beam. Then the light passes through the polarizer 224 to become linearly polarized light, and then be reflected by the reflector 225 to the dichroic mirror 214.

The dichroic mirror 214 reflects $\lambda_2$ and transmits $\lambda_1$, so two beams of linearly polarized light are coupled into one optical path. The relay lens 203, relay lens 207, and mirror 210 can be adjusted to compensate the spherical aberration for two beams of the linearly polarized light, and the spot sizes of the two respectively reach the size close to the diffraction limit. Finally, two beams of light are focused on the selected recording layer medium through the objective lens 401 to trigger the fluorescence two-photon absorption process to complete the data writing.

The fluorescent substance absorbs the two-photon and then emits a fluorescence signal 108 with the center wavelength of $\lambda_3$. The dichroic mirror 218 and 206 reflect $\lambda_3$ while transmit $\lambda_1$ and $\lambda_2$. Since the energy of the fluorescence signal is much smaller than the loss light used. For the filter 220, a bandpass filter with a center wavelength of $\lambda_3$ and cut off wavelengths of $\lambda_1$ and $\lambda_2$ should be selected. The light is focused on the photodetector 302 through an astigmatic lens 221 such as a cylindrical mirror. The photodetector 302 adopts an avalanche photodiode four-quadrant photodetector, which can amplify and detect the fluorescence signal, thereby reading the signal.

In addition, due to the characteristics of the astigmatic lens 221, the astigmatic beam will have axial asymmetry near the focal point, and the intensity of the detected fluorescence signal will change. The two-dimensional translation stage 502 is adjusted according to the focus error signal detected by the photodetector 302 to drive the objective lens 401 for axial movement to achieve axial focus servo.

During the reading and writing process of the optical disc, a laser with a center wavelength $\lambda_4$ is emitted from the servo laser light source 102, which is shaped into a circular beam by the collimator lens 202, and becomes s-polarized light by the polarization beam splitter 205. The dichroic mirror 206 reflects $\lambda_4$, while transmits $\lambda_1$ and $\lambda_2$, making the servo light and the two recording light paths integrated, and only one objective lens is needed. The servo recording layer 004 has high reflection characteristics for the servo light. After reflection, it is equivalent to passing through the ¼ wave plate 209 twice before and after. At this time, the reflected servo light becomes p-polarized light, so when it passes through the polarization beam splitter 205, it is separated from the emitted servo light and focused on the photodetector 301 by the focusing lens 208. The error signal generated by it adjusts the two-dimensional translation stage 502 with the objective lens 401 for radial movement to achieve radial tracking servo. If the disc contains multiple data recording layers, when the recording layer changes from the Nth layer to the N+1th layer, the one-dimensional translation stage 503 needs to be adjusted to drive the relay lens 204 to move at the same time, so that the servo light can be always locked and focused on the servo guide layer 004, thereby realizing radial tracking servo.

The radial servo process in this example is the same as that in Example 1. Firstly, the system presets N error signal reference values $E_1, E_2, \ldots E_N$, according to the number of information tracks N (N=3 shown in the figure) corresponding to each groove. During the actual servo process, for the Kth track, if the detected error signal $E=E_k$, it means that the reading and writing optical focus is already on the track to be tracked, so the tracking servo signal output by the servo control computing module 501 is also 0. If the detected error signal $E<E_k$, it means that the servo light is focused on the left position, and the output tracking servo signal is −TE(s), which drives the nano platform to move the objective lens to the right by the set offset. If the detected error signal $E>E_k$, it means that the servo light is focused on the right position, and the output tracking servo signal is +TE(s), which drives the nano platform to move the objective lens to the left by the set offset. The magnitude of the movement offset is calculated based on the difference between $E$ and $E_k$.

It should be noted that the selection method of the error signal reference value used in the above examples is $E=(I_A+I_B)-(I_C+I_D)$, where $I_A$ $I_B$ $I_C$ $I_D$ are the signal intensity information detected by the four-quadrant photodetector. The selection method of the reference value is only used as an example, and is not limited to only this selection method. The present invention can also use other reference value selection methods, such as: $E=f(I_A+I_B)-f(I_C+I_D)$, where $f(x)$ is the phase of signal x. In summary, as long as the error signal and the position of the servo light center point present a monotonously related function, it can be used as a selection method of the error signal reference value in principle.

It should be noted that the above-mentioned examples list the radial servo devices for two types of super-resolution optical discs (super-resolution optical disc based on stimulated radiation loss microscopy and super-resolution optical disc based on two-photon absorption technology). The purpose is to present the specific embodiments of the present invention in detail, but not to limit the application of the present invention to the radial servo for these two types of super-resolution optical discs. According to the principle of the present invention, it is easy to know that if the optical disc structure comprises the super-resolution optical disc with the structure shown in FIG. 2, they can realize radial servo control through the radial servo device and the servo method of the present invention.

The above-mentioned examples only exemplarily illustrate the principles and effects of the present invention, but are not used to limit the present invention. Anyone familiar with this technology can modify or change the above-mentioned embodiments without departing from the spirit and scope of the present invention. Therefore, all equivalent modifications or changes made by those with common knowledge in the technical field without departing from the spirit and technical ideas disclosed in the present invention should still be covered by the claims of the present invention.

The invention claimed is:

1. A servo device for a super-resolution optical disc, comprising an excitation light source, servo light source, integrated optical path, focusing unit, servo light detection unit, and drive control unit;

the excitation light source emits excitation light, and the servo light source emits servo light, and the excitation light and the servo light reach the focusing unit through the integrated optical path, being focused on the disc surface, the servo light passes through the focusing unit again after being reflected on the disc surface, and then the reflected light is detected by the servo light detection unit, and the detection result is transmitted to the drive control unit;

the excitation light source comprises at least one laser light source with a single wavelength or laser light source with different wavelengths;

the integrated optical path at least comprises a collimator lens, which integrates the servo light and the excitation light to form a coaxial circular parallel beam;

the focusing unit at least comprises an optical element capable of focusing and focuses the excitation light and the servo light on the same axis;

the servo light detection unit detects the servo reflected light beam generated by the servo light beam converged by the focusing unit and reflected by a servo guide layer of the super-resolution optical disc;

the drive control unit presets N detection error reference values for the detection signal of the reflected light generated by the servo guide layer of the servo light irradiating optical disc, and controls the radial position of the focusing unit according to a comparison result of the detection result of the servo reflected light and the detection error reference value, wherein N is an integer greater than 1.

2. The servo device for a super-resolution optical disc according to claim 1, wherein, the servo device is used for a super-resolution optical disc, and the super-resolution optical disc comprises a multi-layer structure, which comprises a servo guide layer containing a spiral groove shape and at least one data recording layer existing thereunder;

data storage units are distributed in a spiral form in the data recording layer, the data storage units on each spiral constituting a data storage track, wherein every N data storage tracks correspond to a groove in the servo guide layer, and N is an integer greater than 1.

3. The servo device for a super-resolution optical disc according to claim 2, wherein, the smallest size of the data storage units is smaller than the diffraction limit of an excitation light of an excitation light source.

4. The servo device for a super-resolution optical disc according to claim 1, wherein, the super-resolution optical disc adopts the methods comprising super-resolution fluorescence microscopy, two-photon absorption technology, super-resolution optical filtering technology, and medium super-resolution technology to produce a recording point smaller than the diffraction limit of the excitation light.

5. The servo device for a super-resolution optical disc according to claim 4, wherein, the super-resolution fluorescence microscopy comprises stimulated radiation loss microscopy.

6. The servo device for a super-resolution optical disc according to claim 5, further comprising a loss light source (103), collimator lens (211), ½ wave plate (215), and polarization beam splitter (216), vortex phase plate (217), the excitation light source (101), collimator lens (201), ½ wave plate (212), polarizing beam splitter (213), dichroic mirror (214), relay lens (203), dichroic mirror (206), relay lens (207), reflector (210), dichroic mirror (218), ¼ wave plate (209), objective lens (401), filter (220), astigmatic lens (221), photodetector (302), the servo laser light source (102), collimator lens (202), polarization beam splitter (205), relay lens (204), focusing lens (208), photodetector (301), two-dimensional translation stage (502) for the placement of the objective lens (401), and one-dimensional translation stage (503) for the placement of the relay lens (204);

the light beam emitted from the loss light source (103) passes through the collimator lens (211), the ½ wave plate (215), the polarization beam splitter (216) and the vortex phase plate (217) in sequence, and then incident on the dichroic mirror (214), and reflected by the dichroic mirror (214) to form a first reflected light;

the light beam emitted from the excitation light source (101) passes through the collimator lens (201), the ½ wave plate (212) and the polarizing beam splitter (213) in sequence, and then incident on the dichroic mirror (214), and transmitted by the dichroic mirror (214) to form a first transmitted light;

the first reflected light and the first transmitted light are combined by the dichroic mirror (214), then incident on the dichroic mirror (206) through the relay lens (203), and then transmitted by the dichroic mirror (206) to form a second transmitted light;

the second transmitted light passes through the relay lens (207) and the reflector (210) in sequence, and then incident on the dichroic mirror (218), and transmitted by the dichroic mirror (218) to form a third transmitted light;

the third transmitted light passes through the ¼ wave plate (209) and the objective lens (401) in sequence, and then incident on the Nth recording layer (002) of the super-resolution optical disc (001), the fluorescence signal generated is collected by the objective lens (401), and then incident on the dichroic mirror (218) through the ¼ wave plate (209), and reflected by the dichroic mirror (218) to form a second reflected light;

the second reflected light passes through the filter (220) and the astigmatic lens (221) in sequence, and reaches the photodetector (302);

the light beam emitted from the servo laser light source (102) is incident on the polarization beam splitter (205) through the collimator lens (202), and reflected by the polarization beam splitter (205) to form a third reflected light with a first linear polarization state;

the third reflected light is incident on the dichroic mirror (206) through the relay lens (204), and reflected by the dichroic mirror (206) to form a fourth reflected light;

the fourth reflected light passes through the relay lens (207), the reflector (210), the dichroic mirror (218), the ¼ wave plate (209) and the objective lens (401) in sequence, and incident on the servo-guide layer (004) of the super-resolution optical disc (001), and reflected by the servo-guide layer (004) to form a fifth reflected light;

the fifth reflected light is incident on the ¼ wave plate (209) through the objective lens (401), and becomes the fifth reflected light with a second linear polarization state through the ¼ (209) wave plate;

the fifth reflected light with the second linear polarization state passes through the dichroic mirror (218), the reflector (210), and the relay lens (207) in sequence, and incident on the dichroic mirror (206), and reflected by the dichroic mirror (206) to form a sixth reflected light;

the sixth reflected light is incident on the polarization beam splitter (205) through the relay lens (204), and transmitted by the polarization beam splitter (205) to form a fourth transmitted light;

the fourth transmitted light reaches the photodetector (301) through the focusing lens (208);

the photodetector (301) respectively connected to the two-dimensional translation stage (502) and the one-dimensional translation stage (503) via a servo control computing module (501).

7. The servo device for a super-resolution optical disc according to claim 6, wherein, the collimator lens (211) shapes the first elliptical beam emitted from the loss light source (103) into a first circular beam, the ½ wave plate (215) is used to adjust the light intensity of the first circular beam, the polarization beam splitter (216) is used to process the first circular beam after passing the ½ wave plate (215) into a third linearly polarized light, the vortex phase plate (217) is used to process the third linearly polarized light into a hollow vortex light with a center light intensity of zero;

the collimator lens (201) shapes the second elliptical beam emitted from the excitation light source (101) into a second circular beam, the ½ wave plate (212) is used to adjust the light intensity of the second circular light, the polarizing beam splitter (213) is used to process the second circular beam after passing the ½ wave plate (212) into the fourth linearly polarized light;

the dichroic mirror (214) is used to couple the hollow vortex light and the fourth linearly polarized light into an optical path, the relay lens (203), the relay lens (207), and the reflector (210) together compensate the spherical aberration of the hollow vortex light and the fourth linearly polarized light, and the ¼ wave plate (209) process the hollow vortex light after compensating the spherical aberration and the fourth linearly polarized light into circularly polarized solid light (37) and hollow vortex light (38) to achieve the best result of stimulated emission loss;

the circularly polarized solid light (37) and hollow vortex light (38) are focused on the medium of the selected Nth recording layer (002) through the objective lens (401) to complete data writing;

the processed circularly polarized solid light (37) and hollow vortex light (38) are focused on the medium of the selected Nth recording layer (002), a fluorescence signal (39) that breaks the diffraction limit being excited, which is separated by the dichroic mirror (218) and the filter (220), then the fluorescence signal detected by the photodetector (302) to complete the signal reading.

8. The servo device for a super-resolution optical disc according to claim 6, wherein, a spiral groove-shaped servo guide layer (004) is pre-engraved on the super-resolution optical disc (001), and the groove width should be larger than the size of the Airy spot of the servo light.

9. The servo device for a super-resolution optical disc according to claim 6, wherein, processed circularly polarized solid light (104) and hollow vortex light (105) are focused on the medium of the selected recording layer, and the center of the two is aligned.

10. The servo device for a super-resolution optical disc according to claim 6, wherein, the first linear polarization state and the second linear polarization state are perpendicular to each other.

11. The servo device for a super-resolution optical disc according to claim 6, wherein, having radial tracking servo control and axial focus servo control, in the process of writing and reading data on the super-resolution optical disc (001) with the excitation light source, loss light source, excited fluorescence signal, and servo laser light source, the axial focus error signal output by the photodetector (302) and the radial tracking error signal output by the photodetector (301) are transmitted to the servo control computing module (501), and the servo control computing module (501) controls the movement and cooperation of the two-dimensional translation stage (502) and the one-dimensional translation stage (503) to realize radial tracking and axial focus servo.

12. The servo device for a super-resolution optical disc according to claim 11, wherein, the fluorescence signal (106) is collected by the photodetector (302) through the astigmatic lens (221), the photodetector (302) outputs the axial focus error signal to the servo control computing module (501), and the servo control computing module (501) controls the two-dimensional translation stage (502) to move axially to make the circularly polarized solid light (104) and the hollow vortex light (105) always focus on the selected Nth recording layer (002).

13. The servo device for a super-resolution optical disc according to claim 12, wherein, when the recording layer needs to be changed to the N+1th recording layer (003), the two-dimensional translation stage (502) is added a constant and stable bias voltage through the servo control computing module (501) while receiving the axial focus and radial tracking error signal, to move the objective lens (401), making the focus of the loss laser and the excitation laser move to the N+1th recording layer (003), and the one-dimensional translation stage (503) is adjusted at the same time to drive the relay lens (204) to move, locking the focus of the servo laser light source (102) on the corresponding position of the servo guide layer (004).

14. The servo device for a super-resolution optical disc according to claim 6, wherein, with the cooperation of the servo control computing module (501), two-dimensional translation stage (502) and one-dimensional translation stage (503), within one groove width of the servo guide layer, multi-track reading and writing can be performed in the corresponding range of the corresponding recording layer.

15. The servo device for a super-resolution optical disc according to claim 6, wherein, the axial focus servo signal and the radial tracking servo signal jointly control the rotation speed of a spindle motor (005) through the servo control computing module (501), making information transmission to be carried out stably and ensuring the accuracy of the servo signal.

16. The servo device for a super-resolution optical disc based on two-photon absorption technology according to claim 5, further comprising the excitation light source (101), a second excitation light source (107), collimator lens (211), polarizer (224), reflector (225), the excitation light source (101), collimator lens (201), polarizer (222), phase delay component (223), dichroic mirror (214), relay lens (203), dichroic mirror (206), relay lens (207), reflector (210), dichroic mirror (218), ¼ wave plate (209), objective lens (401), filter (220), astigmatic lens (221), photodetector (302), servo laser light source (102), collimator lens (202), polarization beam splitter (205), relay lens (204), focusing lens (208), photodetector (301), two-dimensional translation stage (502) for the placement of the objective lens (401), and one-dimensional translation stage (503) for the placement of the relay lens (204);

the light beam emitted from the excitation light source (101) passes through the collimator lens (201), the polarizer (222) and the phase delay component (223) in sequence, and then incident on the dichroic mirror (214), and transmitted by the dichroic mirror (214) to form a first transmitted light;

the light beam emitted from the second excitation light source (107) passes through the collimator lens (211), the polarizer (224) and the reflector (225) in sequence, and then incident on the dichroic mirror (214), and reflected by the dichroic mirror (214) to form a first reflected light;

the first reflected light and the first transmitted light are combined by the dichroic mirror (214), then incident on the dichroic mirror (206) through the relay lens (203), and then transmitted by the dichroic mirror (206) to form a second transmitted light;

the second transmitted light passes through the relay lens (207) and the reflector (210) in sequence, and then incident on the dichroic mirror (218), and transmitted by the dichroic mirror (218) to form a third transmitted light;

the third transmitted light passes through the objective lens (401), and then incident on the Nth recording layer (002) of the super-resolution optical disc (001), the generated fluorescence signal is collected by the objective lens (401), and reflected by the dichroic mirror (218) to form a second reflected light;

the second reflected light passes through the filter (220) and the astigmatic lens (221) in sequence, and reaches the photodetector (302);

the light beam emitted from the servo laser light source (102) is incident on the polarization beam splitter (205) through the collimator lens (202), and reflected by the polarization beam splitter (205) to form a third reflected light with a first linear polarization state;

the third reflected light incident on the dichroic mirror (206) through the ¼ wave plate (209) and the relay lens (204), and reflected by the dichroic mirror (206) to form a fourth reflected light;

the fourth reflected light passes through the relay lens (207), the reflector (210), the dichroic mirror (218) and the objective lens (401) in sequence, and is incident on the servo-guide layer (004) of the super-resolution optical disc (001) and reflected by the servo-guide layer (004) to form a fifth reflected light;

the fifth reflected light sequentially passes through the dichroic mirror (218), the reflector (210), and the relay lens (207), and is incident on the dichroic mirror (206), and reflected by the dichroic mirror (206) to form a sixth reflected light;

the sixth reflected light is incident on the polarization beam splitter (205) through the relay lens (204) and the ¼ wave plate (209), and transmitted through the polarization beam splitter (205) to form a fourth transmitted light;

the fourth transmitted light reaches the photodetector (301) through the focusing lens (208);

the photodetector (301) is connected to the two-dimensional translation stage (502) via the servo control computing module (501), and the photodetector (301) is respectively connected to the two-dimensional translation stage (502) and the one-dimensional translation stage (503) via the servo control computing module (501).

17. The servo device for a super-resolution optical disc according to claim 16, wherein, a spiral groove-shaped servo guide layer (004) is pre-engraved on the super-resolution optical disc (001), and the groove width should be larger than the size of the Airy spot of the servo light.

18. The servo device for a super-resolution optical disc according to claim 16, wherein, having radial tracking servo control and axial focus servo control, in the process of writing and reading data on the super-resolution optical disc (001) with the excitation light source, the second excitation light source, excited fluorescence signal, and servo laser light source, the axial focus error signal output by the photodetector (302) and the radial tracking error signal output by the photodetector (301) are sent to the servo control computing module (501), and the servo control computing module (501) controls the movement and cooperation of the two-dimensional translation stage (502) and the one-dimensional translation stage (503) to realize radial tracking and axial focus servo.

19. The servo device for a super-resolution optical disc according to claim 16, wherein, with the cooperation of the servo control computing module (501), two-dimensional translation stage (502) and one-dimensional translation stage (503), within one groove width of the servo guide layer, multi-track reading and writing can be performed in the corresponding range of the corresponding recording layer.

20. The servo device for a super-resolution optical disc according to claim 16, wherein, the axial focus servo signal and the radial tracking servo signal jointly control the rotation speed of a spindle motor (005) through the servo control computing module (501), making the information transmission to be carried out stably and ensuring the accuracy of the servo signal.

21. The servo device for a super-resolution optical disc according to claim 1, wherein, the servo light source and the excitation light source have different wavelengths.

22. The servo device for a super-resolution optical disc according to claim 1, wherein, the numerical aperture of the focusing unit is not less than 0.65.

23. A servo method for the super-resolution optical disc according to claim 1, wherein, comprising the following steps:
  Step 1: the servo light is focused on the spiral guide groove on the disc through the lens;
  Step 2: the reflected light of the servo light is detected by the signal detection unit and the detection result is transmitted to the drive control unit;
  Step 3: the drive control unit controls the position of the lens according to the detection result to move the focus of the excitation light to the desired data track;
  the drive control unit completes the radial servo of N data tracks according to the reflected light of the servo light in a groove, wherein N is an integer greater than 1.

24. The servo method for the super-resolution optical disc according to claim 23, wherein, the drive control unit pre-sets N reference values for the servo light irradiating different positions in a single groove, comparing detection result of the detection unit with the reference values, drive signal being output to move the objective lens to the target position.

* * * * *